D. DENNEHY.
VALVE.
APPLICATION FILED MAY 24, 1913.

1,079,222.

Patented Nov. 18, 1913.

Witnesses
Floyd R. Cornwall
Francis P. ———

Inventor
Denis Dennehy
By ———
Attorney

UNITED STATES PATENT OFFICE.

DENIS DENNEHY, OF PITTSBURGH, PENNSYLVANIA, ASSIGNOR OF ONE-HALF TO MICHAEL H. DENNEHY, OF PITTSBURGH, PENNSYLVANIA.

VALVE.

1,079,222.

Specification of Letters Patent.

Patented Nov. 18, 1913.

Application filed May 24, 1913. Serial No. 769,591.

*To all whom it may concern:*

Be it known that I, DENIS DENNEHY, of Pittsburgh, in the county of Allegheny and State of Pennsylvania, have invented certain new and useful Improvements in Valves; and I do hereby declare the following to be a full, clear, and exact description of the invention, such as will enable others skilled in the art to which it appertains to make and use the same.

The primary object of this invention is to provide a check valve which will be operative regardless of the direction of flow, it being possible to prevent back pressure when the flow is reversed without changing the position of the valve-casing.

Figure 1:
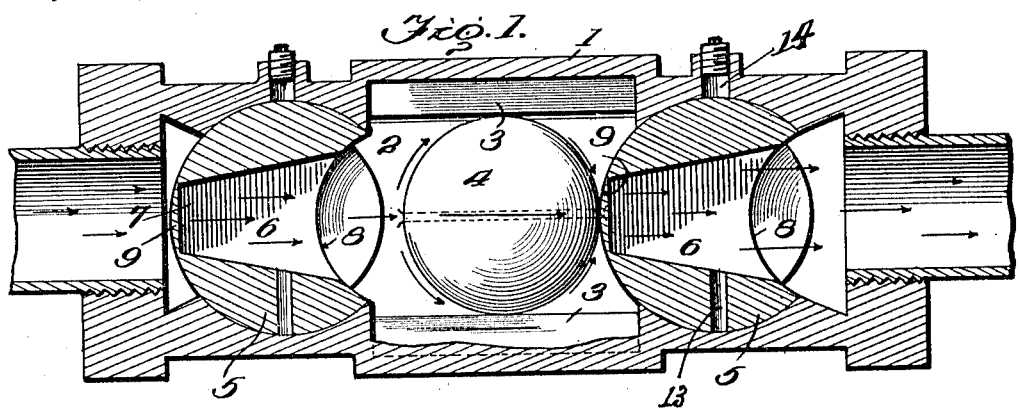
Figure 2:
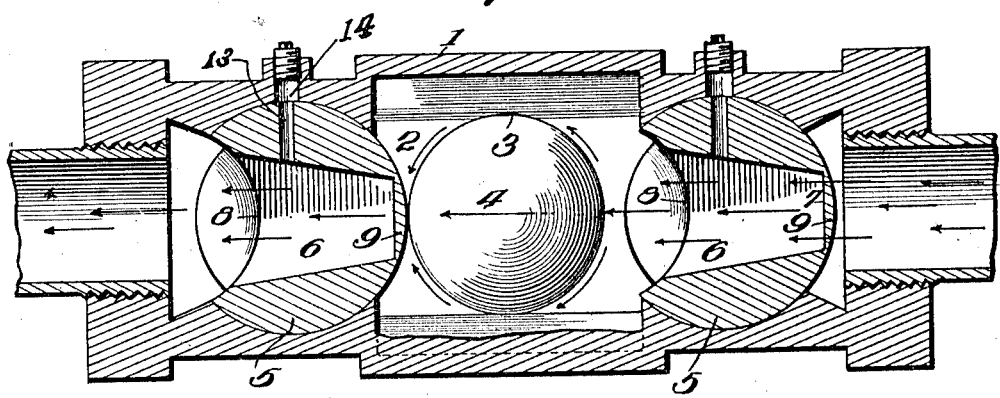
Figure 3:
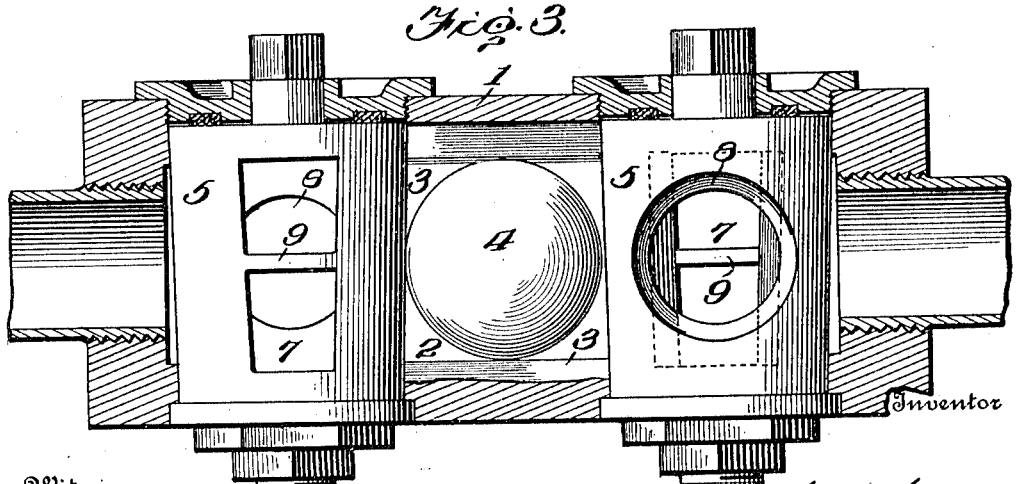

In the accompanying drawings, Figure 1 is a horizontal sectional view showing the parts in the position they occupy when the normal flow is from left to right. Fig. 2 is a similar view showing the parts in position for a flow from right to left. Fig. 3 shows the two plugs on quarter turns relatively to the positions shown in Fig. 1.

Referring to the drawings, 1 designates a casing having a straight-way passage therein, and capable of being secured to sections of a pipe line. Within this casing is a central valve-chamber 2 which is preferably provided with longitudinally extending ribs 3 for guiding a ball valve 4 which is free to move longitudinally within the valve-chamber.

5, 5, designate two plugs whose seats pass transversely through casing 1 on opposite sides of valve-chamber 2. Each plug has a port or passageway 6 extending transversely therethrough, each port terminating at one side of the plug in a comparatively narrow or elongated opening 7 (see Fig. 3) and at the other side in a rounded or spheroidal opening 8 which conforms to the contour of ball-valve 4. The narrow or elongated opening 7 of each plug always faces the line of flow and hence the rounded or spheroidal opening 8 of only one of the plugs at a time will face valve-chamber 2. In consequence, the inflow will keep ball valve 4 from seating against the inwardly-facing opening 8, and the fluid after passing around the ball valve will find its exit through the port in the other plug. For the purpose of preventing the ball valve from sealing the inwardly facing elongated opening 7 of the latter plug I preferably provide a cross member 9 at about the center of such opening. If there is any back pressure, when the parts are in the position shown in Fig. 1, the valve will immediately seat over the opening 8 thereby checking back pressure.

Let it be assumed that the parts are in the position shown in Fig. 1 when the device is mounted in a feed line, and it then be discovered that the line of flow is from right to left instead of from left to right. It is only necessary in such contingency, for the operator to give each plug a half turn when, as shown in Fig. 2, the opening 8 of the plug to the right will coincide with the valve chamber, and the elongated opening 7 of the plug to the left will face such chamber. Hence, under such conditions the ball valve will normally be kept from its seat by the flow, but will be immediately seated by any back pressure. Thus it will be seen that it is immaterial how the valve casing is located in the feed line, that is to say, there is no danger of its being rendered inoperative by reason of the reversal of its ends, since the plugs may be readily turned into either of the positions desired. In some instances, where the same feed line is desired for conveying fluids alternately in opposite directions it is only necessary to reverse the plugs.

I have shown each plug as having a central stud 10 projecting therefrom whereby any suitable implement may be employed for turning it, and I have likewise shown them equipped at their opposite ends with threaded projections for accommodating binding nuts 12 between which and the casing are suitable washers. It will be understood, of course, that the seats for the plugs may be made of any suitable material and after any desired form, and that suitable marks on the plugs and casing will indicate the positions of the plugs. Each plug is provided with a small lateral port 13 for coinciding with side openings 14 to drain the valve casing.

From what has been said it will be seen that a valve constructed as herein described has many advantages. Not only may it be used in a pipe line having the flow alternately in opposite directions and capable under all conditions of checking back pres-